UNITED STATES PATENT OFFICE.

HENRY STALAY ARTHUR HOLT, OF LUDWIGSHAFEN, GERMANY, ASSIGNOR TO BADISCHE ANILIN & SODA FABRIK, OF LUDWIGSHAFEN, GERMANY, A CORPORATION OF GERMANY.

SUBSTITUTED INDOXYL AND PROCESS OF MAKING SAME.

SPECIFICATION forming part of Letters Patent No. 713,437, dated November 11, 1902.

Application filed October 8, 1901. Serial No. 77,977. (No specimens.)

*To all whom it may concern:*

Be it known that I, HENRY STALAY ARTHUR HOLT, doctor of philosophy and chemist, a subject of the King of Great Britain and Ireland, Emperor of India, residing at Ludwigshafen-on-the-Rhine, in the Kingdom of Bavaria, Germany, have invented new and useful Improvements in Substituted Indoxyl and Process of Producing the Same, of which the following is a specification.

My invention relates to the production of hitherto-unknown halogen substituted derivatives of indoxyl.

I have discovered that indoxyl or substances which are easily transformed into indoxyl, such as indoxylic acid, can be converted by the action of halogens in neutral or acid solution or suspension into well-defined halogen substitution products, and when indoxylic acid is employed carbonic acid is at the same time split off. Instead of directly employing the free halogens—that is, chlorin, bromin, or iodin—for effecting the reaction, substances, or mixtures which generate halogens—for instance, potassium chlorate or hypochlorite and hydrochloric acid—can be employed. The halogen-indoxyl derivatives thus obtained are yellow to greenish-yellow substances, which are insoluble or difficultly soluble in water and acids and which can easily be converted into indigo coloring-matter both on and off the fiber, whereas indoxyl must be condensed to indigo by treatment with an oxidizing agent—for example, air—in order to convert it into ordinary indigo. Chlor, brom, and iodo indoxyl, although converted into indigo or an indigo substance by similar treatment, also undergo this change, as I have discovered, by being caused to condense by the action of certain condensing agents which do not exert an oxidizing action. Thus brom-indoxyl on treatment with hot hydrochloric-acid solution or on boiling with an alcoholic or aqueous solution of sodium acetate or the like or on heating with organic bases, such as pyridin or anilin, is converted into a new brominated indigo; but chlor and iodo indoxyl on similar treatment yield ordinary indigo. The same change can be effected by heating the halogen indoxyls with water to a high temperature or by allowing them to remain in a moist condition at ordinary temperature for a sufficient length of time, and also, as before mentioned, by the action of alkali and air or of ferric chlorid in the known manner.

The following examples will serve to further illustrate the nature of my invention and the manner in which the same may be carried into practical effect; but the invention is not confined to these examples. The parts are by weight.

*Example 1—Production of brom-indoxyl in acid solution.*—Make a solution of thirteen (13) parts of indoxyl in one thousand (1,000) parts of water and add thereto ice and sufficient hydrochloric acid to make the liquid strongly acid. Then slowly introduce about forty-eight (48) parts of bromin in the form of bromin-water until a drop of the reaction liquid on filter-paper gives a border which does not become blue on touching with dilute caustic-soda solution—that is, until practically no more unaltered indoxyl is present. Drain the yellow precipitate of brominated indoxyl on the filter-pump and wash with water. Instead of using isolated indoxyl, indigo melts containing indoxyl, such as can be obtained in accordance with the specification of Patent No. 546,165, can be employed after being acidified with hydrochloric acid at a temperature of about zero centigrade. Instead of indoxyl in the above example the corresponding quantity of indoxylic acid can be used.

*Example 2—Production of brom-indoxyl in neutral solution.*—Dissolve one (1) part of pure crystallized indoxyl, such as can be obtained, for example, according to the description given in *Berichte*, volume 34, page 1,856, or by salting out an aqueous solution of indoxyl with common salt in seventy parts of water. To this solution add ice and one-half ($\frac{1}{2}$) part of finely-ground magnesia which has been made into a paste with water, and, as explained in Example 1, add bromin-water to the solution until no more unchanged indoxyl is present therein.

*Example 3—Production of chlor-indoxyl.—* To one (1) part of indoxyl dissolved in water kept slightly acid by means of acetic acid add a clear filtered solution of calcium hypochlorite until a drop of the reaction liquid on filter-paper leaves a border which does not become blue on being made alkaline, thus denoting the absence of unaltered indoxyl. After a short time drain on the pump the green-yellow precipitate formed, wash it with water, and dry in vacuum.

Now what I claim is—

1. The manufacture of substituted indoxyl by treating an indoxylic substance with halogen.

2. The manufacture of substituted indoxyl by treating an indoxylic substance with bromin.

3. As a new body substituted indoxyl such as can be obtained by treating an aqueous solution of indoxyl made acid by means of hydrochloric acid with halogen, which on boiling with pyridin yields an indigo.

4. As a new body brom substituted indoxyl such as can be obtained by treating an aqueous solution of indoxyl made acid by means of hydrochloric acid with bromin which on boiling with pyridin yields brom-indigo.

In testimony whereof I have hereunto set my hand in the presence of two subscribing witnesses.

HENRY STALAY ARTHUR HOLT.

Witnesses:
 JOHN L. HEINKE,
 JACOB ADRIAN.